(12) United States Patent
Aboujaoude et al.

(10) Patent No.: US 12,440,243 B1
(45) Date of Patent: Oct. 14, 2025

(54) APPARATUS AND METHODS FOR A BONE FIXATION PLATE

(71) Applicants: Emad S Aboujaoude, Portland, OR (US); Cory Carlston, Lake Oswego, OR (US)

(72) Inventors: Emad S Aboujaoude, Portland, OR (US); Cory Carlston, Lake Oswego, OR (US)

( * ) Notice: Subject to any disclaimer, the term of this patent is extended or adjusted under 35 U.S.C. 154(b) by 282 days.

(21) Appl. No.: 18/126,976

(22) Filed: Mar. 27, 2023

Related U.S. Application Data

(60) Provisional application No. 63/323,501, filed on Mar. 25, 2022.

(51) Int. Cl.
*A61B 17/68* (2006.01)
*A61F 2/30* (2006.01)

(52) U.S. Cl.
CPC .... *A61B 17/68* (2013.01); *A61F 2002/30622* (2013.01)

(58) Field of Classification Search
CPC ......... A61B 17/58; A61B 17/60; A61B 17/66; A61B 17/68; A61B 17/7058; A61B 17/7059; A61B 17/80; A61B 2017/681

USPC ............................ 606/60, 62, 280, 283, 284
See application file for complete search history.

(56) References Cited

U.S. PATENT DOCUMENTS

| | | | |
|---|---|---|---|
| 8,579,898 B2 * | 11/2013 | Prandi | A61B 17/8061 606/280 |
| 8,808,334 B2 * | 8/2014 | Strnad | A61B 17/80 606/280 |
| 9,579,133 B2 * | 2/2017 | Guthlein | A61B 17/80 |
| 2004/0116930 A1 * | 6/2004 | O'Driscoll | A61B 17/8061 606/907 |
| 2005/0085818 A1 * | 4/2005 | Huebner | A61B 17/1728 606/291 |

* cited by examiner

*Primary Examiner* — Eduardo C Robert
*Assistant Examiner* — Christina Negrellirodriguez
(74) *Attorney, Agent, or Firm* — J. Curtis Edmondson; Law Office of J Curtis Edmondson

(57) ABSTRACT

The present inventive subject matter is a bone fixation device where the distal end of the bone fixation device is affixed to the digit of a hand and the proximal end of the bone fixation device is connected to the a bone in the arm. There is a middle section between the proximal section and the distal section.

14 Claims, 10 Drawing Sheets

900

SECTION A-A

1000

APPARATUS AND METHODS FOR A BONE FIXATION PLATE

RELATED APPLICATIONS

The present application incorporates by reference the U.S. Provisional Patent Application No. 63/323,501 m filed on Mar. 25, 2023, which is incorporated herein by reference

BACKGROUND OF THE INVENTION

Currently the method of positioning, retracting and holding the hand or current technology is based on early designs that spanned the wrist under the soft tissues along the 3rd and 4th wrist compartment and fixed at the 3rd MC distally and the radial shaft proximally with the plate fitting along the Ulnar aspect of Lister's tubercle.

Early plate designs were based on placing a straight plate under the 3rd & 4th dorsal wrist compartments with attachments on the 3rd metacarpal and Ulnar aspect of radial shaft.

This surgical technique often leaves inadequate restoration of alignment and is associated with tendon entrapment of the Extensor Pollicis Longus and Extensor Indicis Proprius.

Surgical technique was modified in that the plate is now most often placed under the 2nd dorsal wrist compartment and secured to the 2nd metacarpal and the dorsal-radial aspect of the radial shaft. This minimizes risk of tendon entrapment and is associated with better alignment.

No change in plate design to accommodate for the angulation between the ulnarly deviated $2^{nd}$ metacarpal (for fracture reduction) and the shaft of the radius.

Current plates used in the 2nd compartment limit reduction options and plate fit. The straight design of the plate does not take full advantage of the relationship between the 2nd metacarpal and the radial shaft.

This surgical approach had a high complication rate for extensor tendon rupture. The approach was then changed to pass the bridge plate under the soft tissue along the 2nd wrist compartment and fixed at the 2nd MC distally and the radial shaft proximally with the plate fitting along the Radial aspect of Lister's tubercle.

These are:
Acumed's Wrist Spanning Plate
Arthrex Spanning Plate
DePuy Spanning Plate
ESASI Spanning Plate
Globus Anthern Plate
Medartis Trilock
Skeletal Dynamics.

These plates all are designed for longitudinal distraction to be applied at the 2nd or 3rd metacarpal. Most of these designs use a universal plate for a right or a left wrist and all have a single trajectory distraction without regard for fracture pattern or positioning needs. None of the plate designs allow for distraction with ulnar deviation thereby limiting the surgeon ability to restore fracture reduction. Shortcomings of the current technology is if any of the existing plates is fixed onto the 3rd metacarpal then there is an increased risk of extensor tendon complications and limitation in reduction positions. However, if any of the existing plates is fixed on to the 2nd metacarpal the risk of extensor tendon complication is minimized but the issue of limited reduction position still remains. This plate is limb specific designed and attaches to the 2nd MC distally for decreased extensor tendon complications. Additionally, it is designed with a sagittal bend which provides better reduction positions that restore joint length, articular congruity and anatomic radial inclination. In short this plate design allows for better anatomic fit and better fracture reduction.

Currently, there are no designs that address the anatomic alignment differences between the 2nd and 3rd metacarpal shafts, plate placement along the radial aspect of Lister's tubercle and the change in angular alignment with respect to the radial shaft. The current designs having a change in approach without the change in plate design results in poor anatomic fit with limited fracture reduction positions and a battle between appropriate plate placement versus appropriate fracture reduction for the patient.

This invention seeks to remedy these problems by providing the surgeon with an internal fixation device that provides better anatomic fit and better fracture reduction positions.

SUMMARY OF THE INVENTION

It is an object of this invention for a bone fixation apparatus that has a distal end piece; the distal end piece capable of being attached to a bone of a hand with a proximal end piece; the proximal end piece capable of being attached to a bone of an arm, and a middle end piece interposed between the distal end piece and the proximal end piece, the middle end piece having two points of angular adjustment, along the z-axis and the y-axis; and a distal end piece is attached to the bone of the arm and the proximal end piece is attached to the bone of the an arm, two angles are formed relative to the z-axis and the y-axis.

It is also an object of this invention to implement the fixation of a bone with the steps of selecting and sizing a distal end piece; selecting and sizing a proximal end piece joining the distal end piece to one end of the middle piece and joining the proximal end piece to the other end of the middle piece; such that the joining induces and angle relative to the z-axis and y-axis between the distal end piece and the proximal end piece.

DETAILED DESCRIPTION

Figure 1:
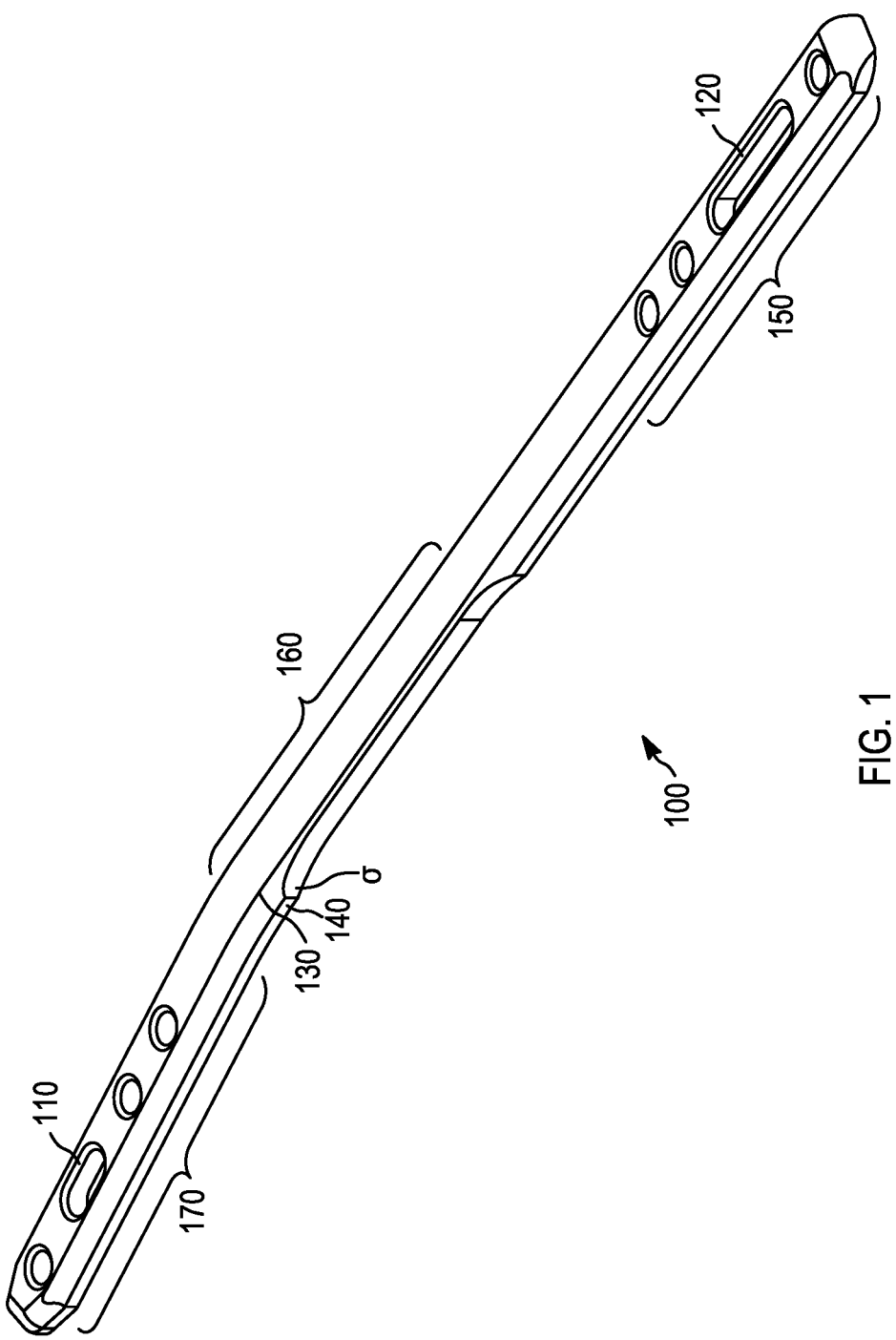
FIG. 1 is an isometric view of the bone fixation plate.

Referring to FIG. 1 which shows an isometric view of the bone fixation plate 100. The bone fixation plate 100 has distal end 110 and a proximal end 120. The bone fixation device 100 is typically made from any material that does not react with the surrounding human tissue. Also the bone fixation plate 100 should be made from a material that will resist physical stress and keep the bone, when attached to the fixation device in a locked and stable position. The bone fixation plate (as viewed head on along the "z" axis) can be in the shape of a flat sheet, the shape of elliptical format, the shape of a rectangular format, a square format, or an irregular format. In the one embodiment, illustrated in the application, the bone fixation device has a pill-like structure, with tapers at each end, when the bone fixation device is viewed head on. The distal end 110 is approximately the length from the base of the proximal phaylnx of the metacarpal bone to a portion of the radius or the ulna, depending on where the bone fixation plate is affixed. At the distal junction point 130 there is an angular bend relative to the z-axis (the z-axis running lengthwise along the length of the bone fixation plate. At the distal juncture point 130 there is also a second angular bend 140. This second angular bend is relative to the y-axis at the distal junction point 130. Between the distal end 110 and the proximal end 120, there is a middle section 160 that can vary in length. The variation in length which would depend on the anatomical characteristics of the particular patient and the condition of the injury. Likewise, the distal end 110 and the proximal end 120 have mounting holes for attachment to the bone. As shown in the embodiment, the length of the distal end 170 can vary based on the anatomical characteristics of the patient and the length of the proximal end 150 can likewise vary based on the anatomical characteristics of the patient. Further the length of the middle section 160 may also vary.

Figure 2:
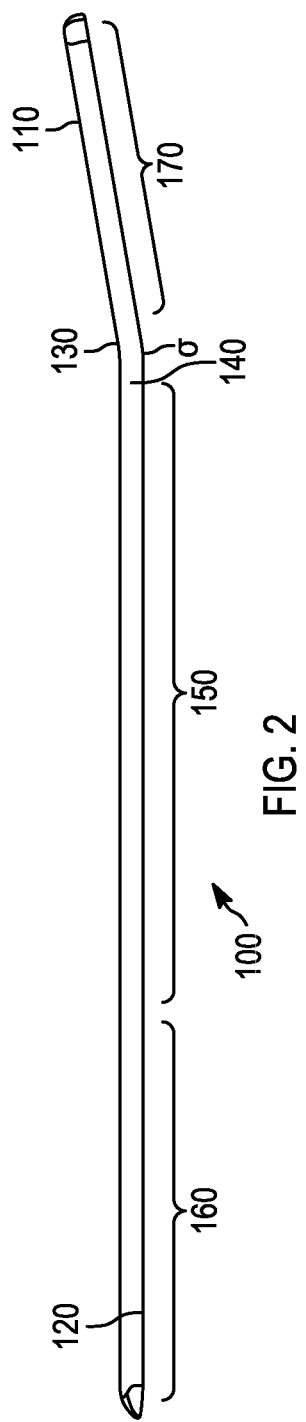
FIG. 2 is a side view of the bone fixation plate.

FIG. 2 shows a side view of the bone fixation device as was shown in FIG. 1. The side view shows an angle between the distal end 110 and at the middle section.

Figure 3:
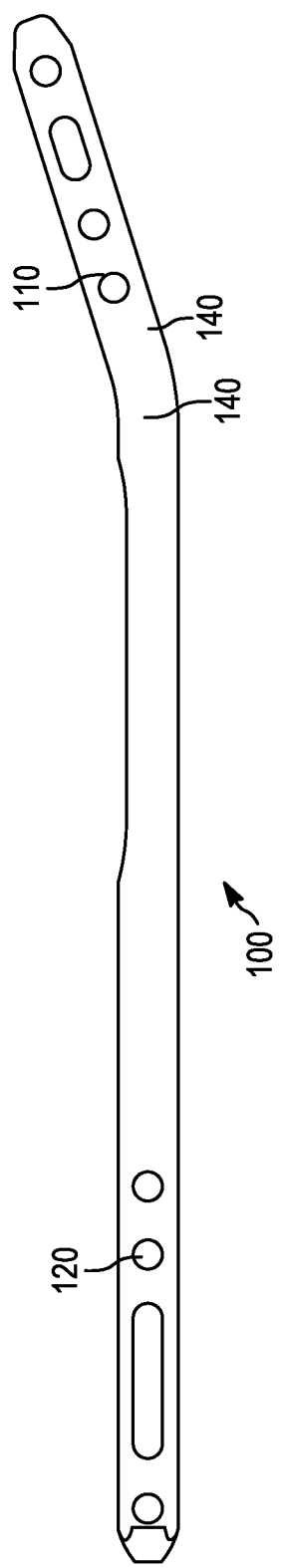
FIG. 3 is a top view of the bone fixation plate.

FIG. 3 shows a top view of the bone fixation device 100. The top view illustrates the angle 140 between the distal end 110, the middle portion, and the proximal end 120.

Figure 4:
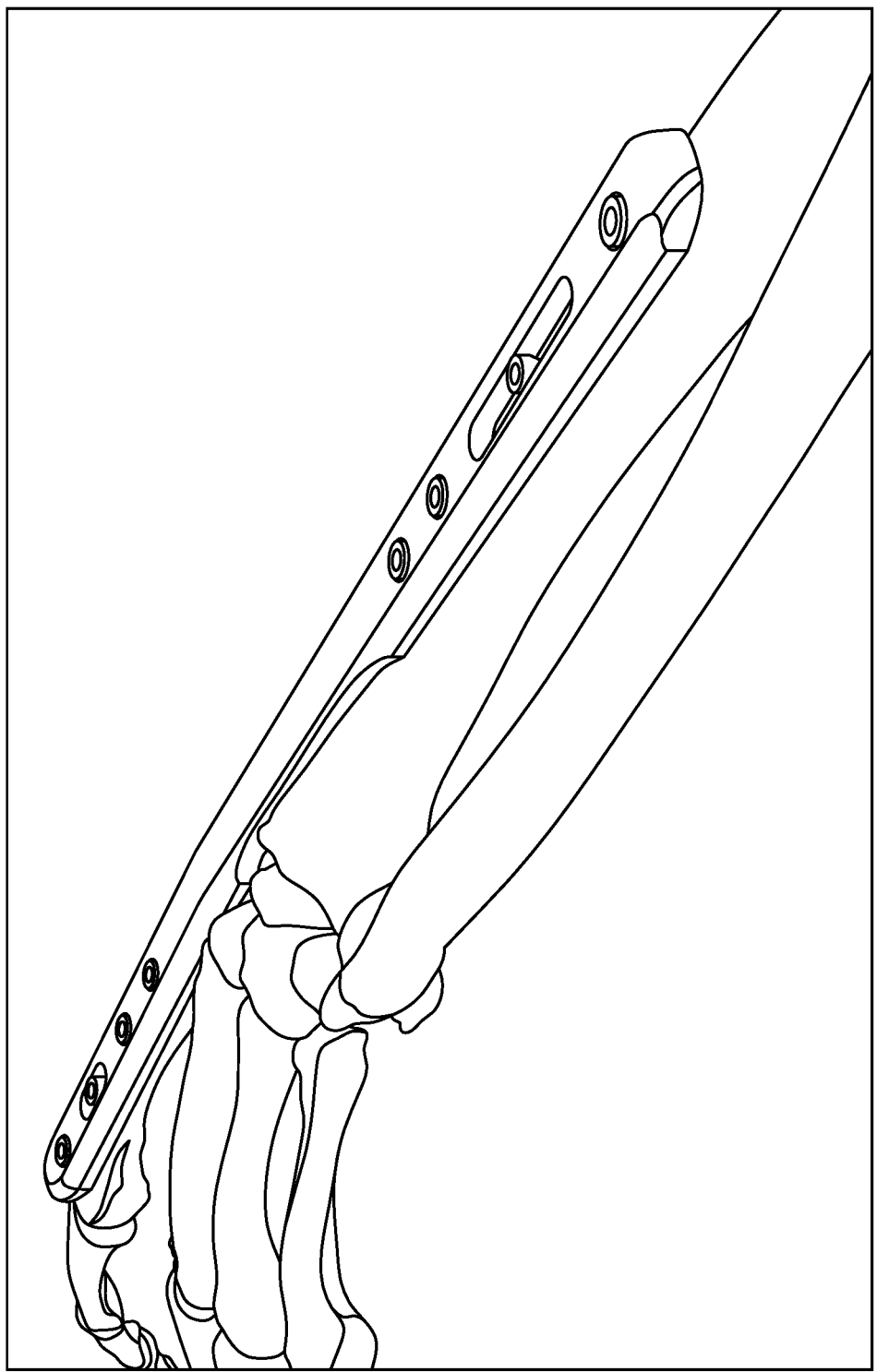
FIG. 4 is an overlay of the bone fixation plate with perspective view as mounted onto the hand.

FIG. 4 shows a perspective view overlay of the bone fixation device on a hand. The attachment screws 180A, 180B attach the bone fixation device 100 and fix the bones of the hand relative to the bones of the arm.

Figure 5:
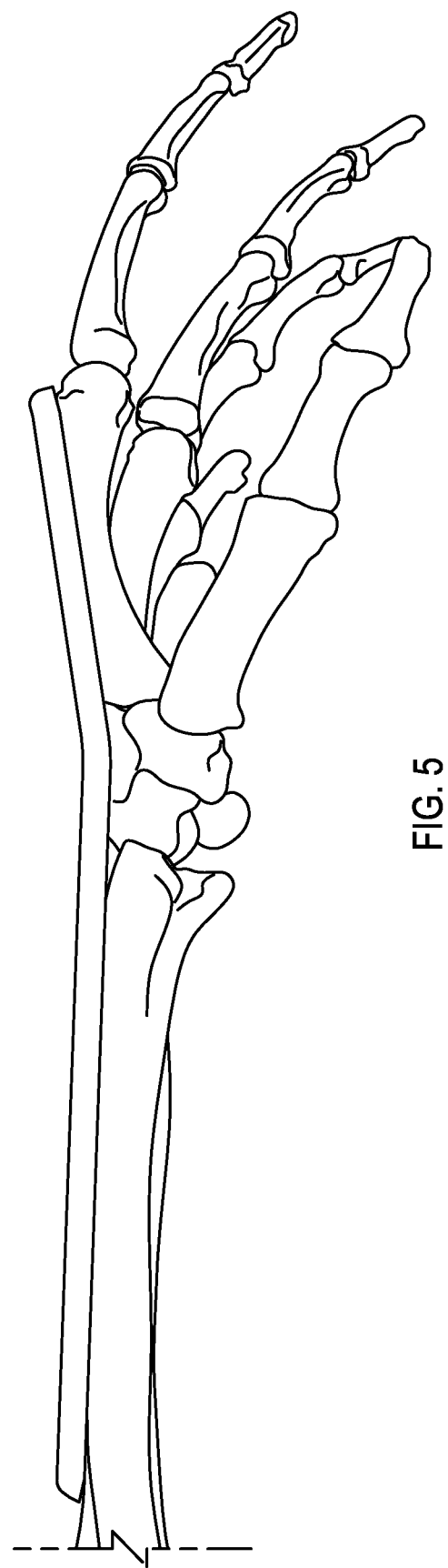
FIG. 5 is a side view of the bone fixation plate mounted onto the hand.

FIG. 5 shows a side view overlay of the bone fixation device on the hand illustrating the attachment points but also the upwards angle of the distal portion of the bone fixation device relative to the arm.

Figure 6:
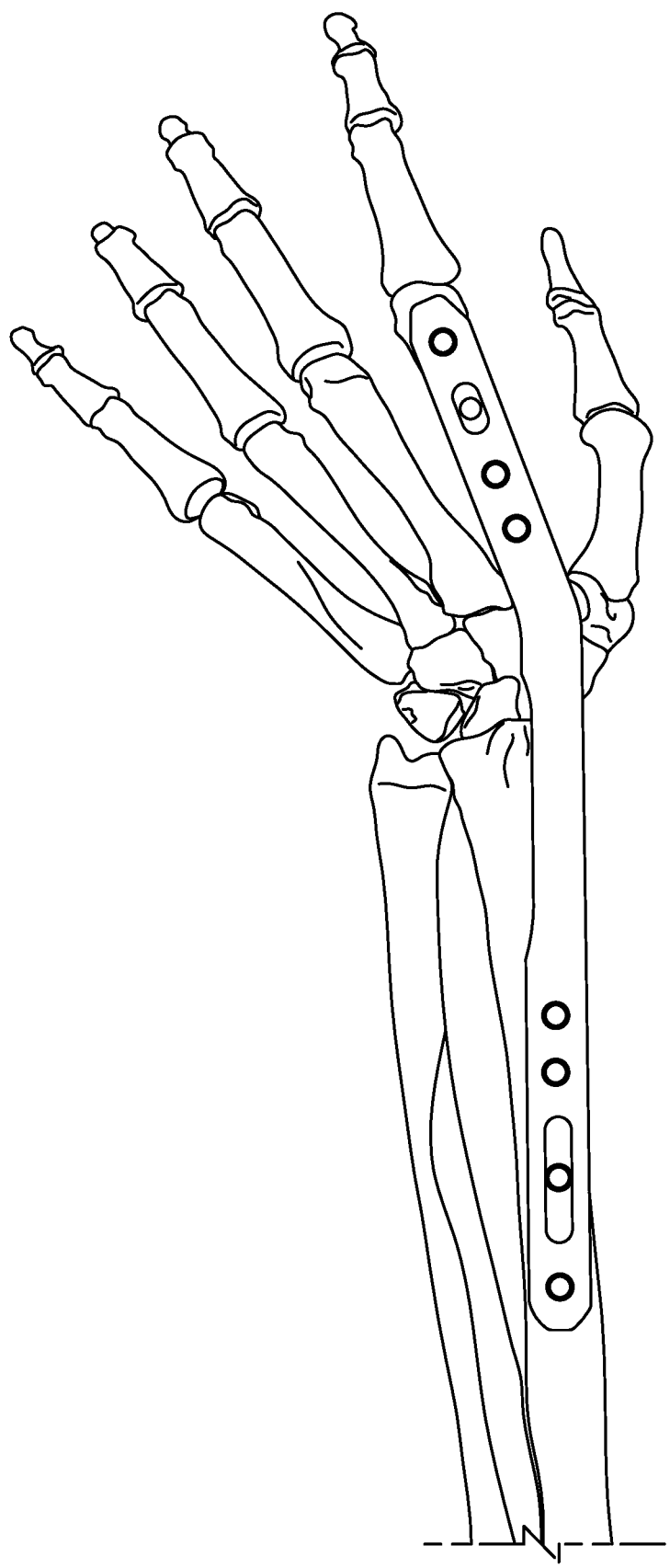
FIG. 6 is a top view of the bone fixation plate mounted onto the hand.

FIG. 6 shows a top view of the bone fixation device showing the angle at the distal part of the bone fixation device that, in this instance, places the second digit at an angle relative to the bone in the arm.

Figure 7:
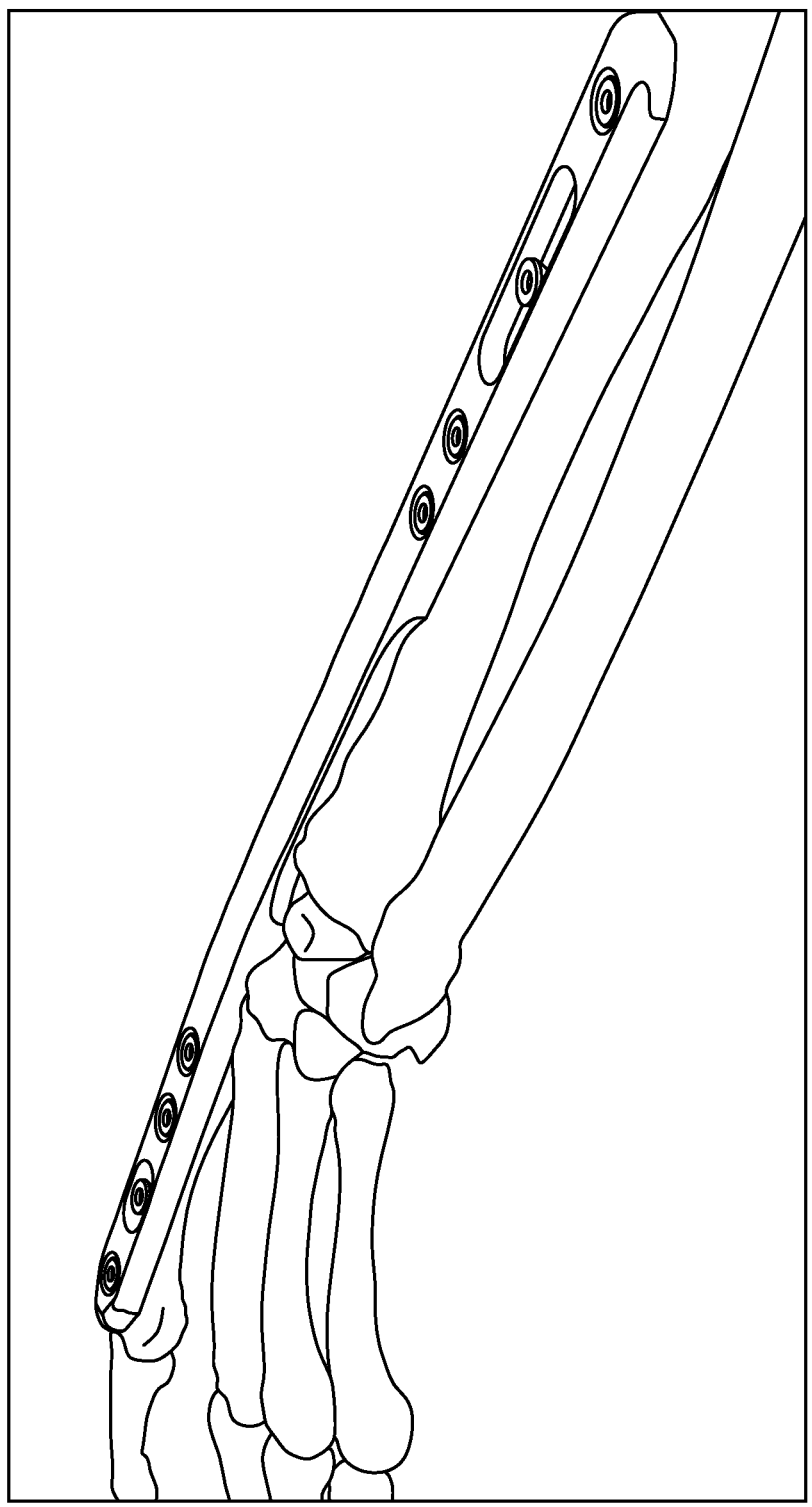
FIG. 7 is a top view of the bone fixation plate mounted onto the hand.
Figure 8:
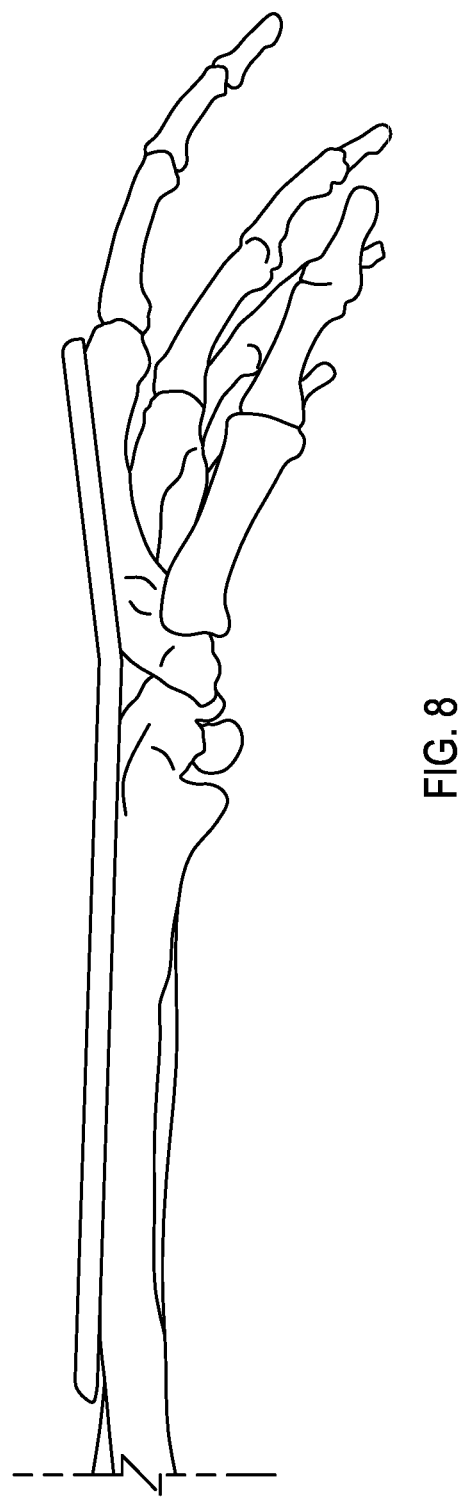
FIG. 8 is a side view of the bone fixation plate mounted onto the hand.

FIG. 7 is likewise another perspective view of the device where the bone is shown as in a wireframe format. FIG. 8 shows a side perspective view of the bone fixation device where the bone is in a wireframe format.

The bone fixation device can be manufactured as a uniform object, either by removing material, such as by a lathe, or adding material, such as by a 3D printer. The bone fixation device can also be manufactured in sections, the distal end can be manufacture separate from the proximal end and the two pieces joined by a separately manufactured middle part. Also part that induces that angle, both along the z-axis and along the y-axis can be separately manufactured. If the parts are separately manufactured then they can be assembled using conventional manufacturing techniques using glues, welding, screws, etc. Also, the joinder of pieces where there are angles, may involve adjustment screws to adjust the various angles.

Figure 9A:
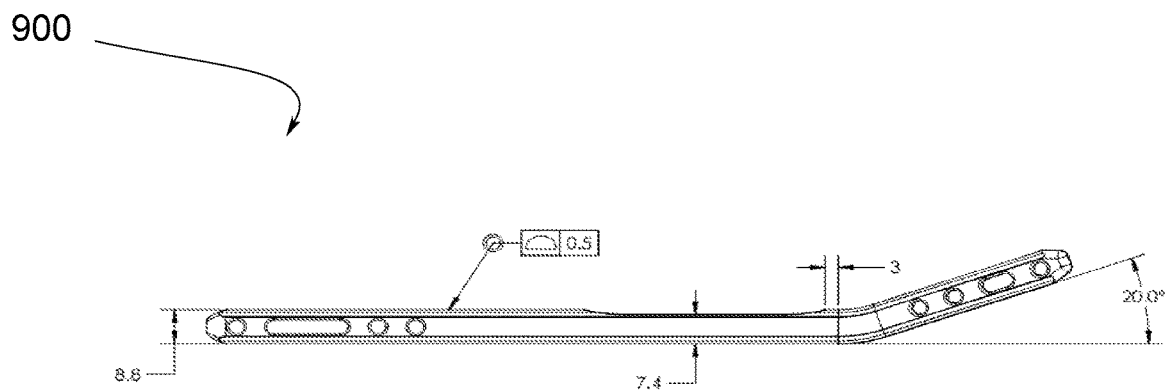
FIGS. 9A, 9B, and 9C is one embodiment of the bone fixation plate.
Figure 9B:
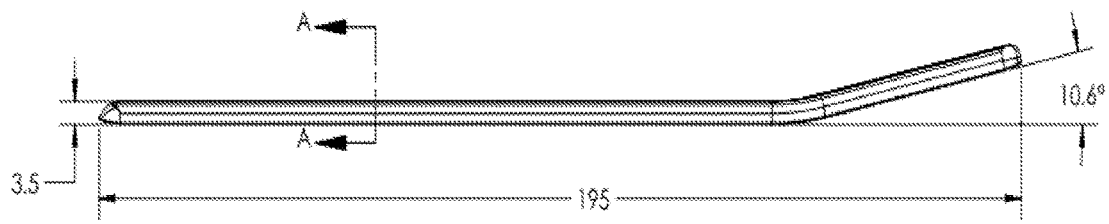
Figure 9C:
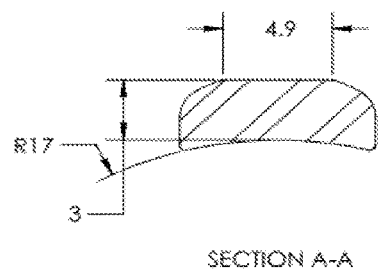

Now referring to FIGS. 9A, 9B, and 9C which shows the top, side, and end view of the bone fixation device. Viewing FIG. 9A the preferred angle shown in this view is 20 degrees, but this may vary from 15 to 25 degrees. View FIG. 9B, the angle shown in this view is 10.6 degrees, but this may vary from 7 to 13 degrees. The preferred overall length is 195 cm, but this may also vary from 130 cm to 210 cm. Viewing FIG. 9C, the edge on view, the preferred dimensions is 7.2 cm in width (4.9 cm on the rounded side), but these dimensions may vary from 6.0 cm in width to 8.0 cm in width.

Figure 10A:
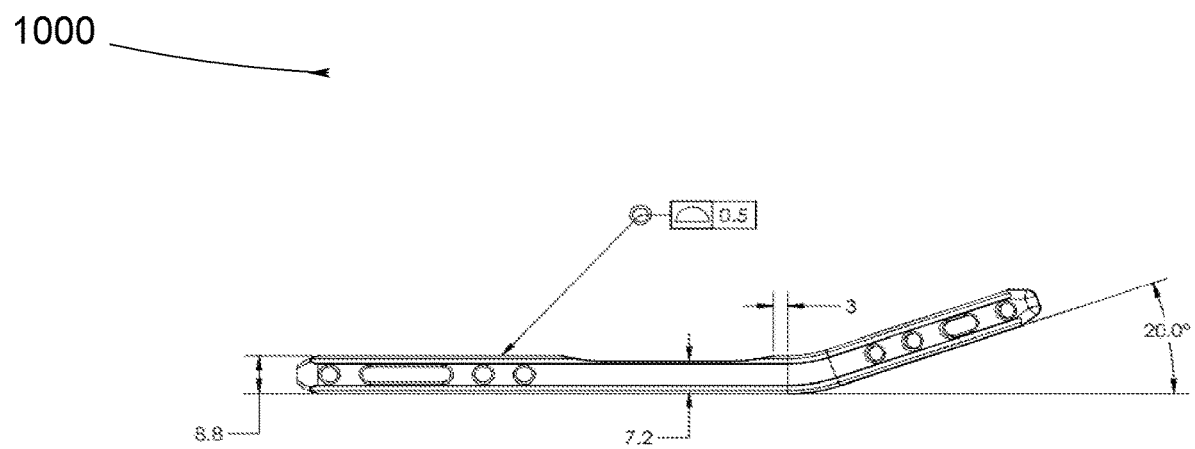
FIGS. 10A, 10B, and 10C is one embodiment of the bone fixation plate.
Figure 10B:
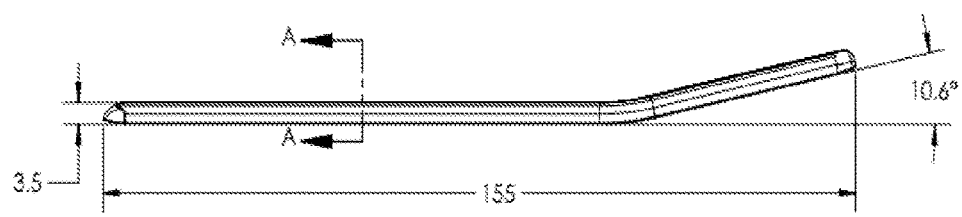
Figure 10C:
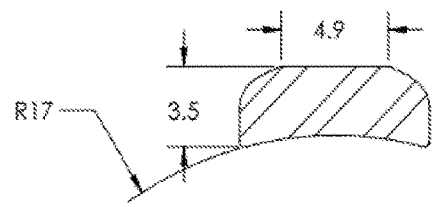

Now referring to FIGS. 10A, 10B, and 10C which shows the top, side, and end view of the bone fixation device. Viewing FIG. 10A the preferred angle shown in this view is 20 degrees, but this may vary from 15 to 25 degrees. View FIG. 10B, the angle shown in this view is 10.6 degrees, but this may vary from 7 to 13 degrees. The preferred overall length is 195 cm, but this may also vary from 130 cm to 210 cm. Viewing FIG. 10C, the edge on view, the preferred dimensions is 7.2 cm in width (4.9 cm on the rounded side), but these dimensions may vary from 6.0 cm in width to 8.0 cm in width.

The material used for the bone fixation device may be metals, plastics, or other materials with sufficient strength to set the bones. Also the materials may be radiolucent to allow x-rays of the hands without the device interfering with the imaging process.

Persons skilled in the art will recognize that many modifications and variations are possible in the details, materials, and arrangements of the parts and actions which have been described and illustrated in order to explain the nature of this inventive concept and that such modifications and variations do not depart from the spirit and scope of the teachings and claims contained therein.

While the applicant understands that claims are not a necessary component of a provisional patent application and has not included detailed claims, the inventor reserves the right to claim, without limitation, the following subject matter.

The invention claimed is:

1. A bone fixation device comprising:
   a distal end piece; the distal end piece capable of being attached to a bone of a hand;
   a proximal end piece; the proximal end piece capable of being attached to a bone of an arm;
   a middle end piece interposed between the distal end piece and the proximal end piece, the middle end piece including a distal junction point having:
      a first angular bend formed relative to a z-axis extending along the length of the bone fixation device, and
      a second angular bend formed relative to a y-axis perpendicular to the z-axis; and
   wherein when the distal end piece is attached to the bone of the hand and the proximal end piece is attached to the bone of the arm, two angles are formed relative to the z-axis and the y-axis.

2. The bone fixation device of claim 1, wherein the distal end piece and the proximal end piece each include mounting holes for attachment to the bone.

3. The bone fixation device of claim 1, wherein a length of the distal end piece, the proximal end piece, and the middle end piece are selected based on an anatomical characteristics of a patient.

4. The bone fixation device of claim 1, wherein end portions of the distal end and the proximal end are tapered.

5. The bone fixation device of claim 1, wherein the distal junction point is located at a transition between the middle end piece and the distal end piece.

6. The bone fixation device of claim 1, wherein the bone fixation device is made from a non-human tissue reactive material and is configured to resist physical stress and keep the bone, when attached, in a locked and stable position.

7. The bone fixation device of claim 1, wherein the distal end piece is approximately a length from a base of a proximal phalanx of a metacarpal bone to a portion of a radius or ulna.

8. A method of manufacturing a bone fixation device comprising the steps of:
  selecting and sizing a distal end piece;
  selecting and sizing a proximal end piece;
  joining the distal end piece to one end of a middle piece and joining the proximal end piece to another end of the middle piece;
  forming a distal junction point in the middle end piece;
  forming a first angular bend at the distal junction point relative to a z-axis extending along a length of the bone fixation device; and
  forming a second angular bend at the distal junction point relative to a y-axis perpendicular to the z-axis.

9. The method of claim 8, further comprising forming mounting holes in each of the distal end piece and the proximal end piece for attachment to bone.

10. The method of claim 8, wherein the distal end piece, the proximal end piece, and the middle end piece are selected and sized based on anatomical characteristics of a patient.

11. The method of claim 8, further comprising tapering end portions of the distal end piece and the proximal end piece.

12. The method of claim 8, wherein the distal junction point is located at a transition between the middle end piece and the distal end piece.

13. The method of claim 8, further comprising manufacturing the bone fixation device from a non-human tissue reactive material.

14. The method of claim 8, wherein the distal end piece is selected to have a length extending from a base of the proximal phalanx of a metacarpal bone to a portion of a radius or ulna.

* * * * *